US011723302B2

(12) United States Patent
Anderson et al.

(10) Patent No.: US 11,723,302 B2
(45) Date of Patent: Aug. 15, 2023

(54) PARTICLE DELIVERY ASSEMBLY OF AN AGRICULTURAL ROW UNIT

(71) Applicant: CNH Industrial America LLC, New Holland, PA (US)

(72) Inventors: Brian John Anderson, Yorkville, IL (US); Chad Michael Johnson, Arlington Heights, IL (US); Patrick Dinnon, Plainfield, IL (US); Grant Thomas Macdonald, Hampshire, IL (US); Brent David Elwing, Geneva, IL (US)

(73) Assignee: CNH Industrial America LLC, New Holland, PA (US)

( * ) Notice: Subject to any disclaimer, the term of this patent is extended or adjusted under 35 U.S.C. 154(b) by 422 days.

(21) Appl. No.: 16/985,943

(22) Filed: Aug. 5, 2020

(65) Prior Publication Data
US 2021/0059109 A1    Mar. 4, 2021

Related U.S. Application Data

(60) Provisional application No. 62/891,755, filed on Aug. 26, 2019.

(51) Int. Cl.
*A01C 7/12*    (2006.01)
*A01C 7/04*    (2006.01)
(Continued)

(52) U.S. Cl.
CPC .............. *A01C 7/12* (2013.01); *A01C 7/044* (2013.01); *A01C 7/082* (2013.01); *A01C 7/084* (2013.01); *A01C 15/006* (2013.01)

(58) Field of Classification Search
CPC .. A01C 7/12; A01C 7/082; A01C 7/08; A01C 7/00; A01C 7/081; A01C 7/044;
(Continued)

(56) References Cited

U.S. PATENT DOCUMENTS 3,974,377 A    8/1976 Steffen
4,163,507 A    8/1979 Bell
(Continued)

FOREIGN PATENT DOCUMENTS

CA    2710692 A1 *  7/2011 ............ A01C 7/105
DE    102007014792 A1   10/2008
(Continued)

OTHER PUBLICATIONS

U.S. Appl. No. 16/985,858, filed Aug. 5, 2020, Brian John Anderson.
(Continued)

*Primary Examiner* — Christopher J. Novosad
(74) *Attorney, Agent, or Firm* — Rebecca Henkel; Rickard DeMille

(57) ABSTRACT

A particle delivery assembly of an agricultural row unit includes a particle tube configured to receive a particle and to deliver the particle toward a trench in soil. The particle tube includes a first body portion, a second body portion, and a hinge coupled to the first body portion and to the second body portion. The hinge is configured to enable the first body portion and the second body portion to pivot relative to one another between an open position of the particle tube and a closed position of the particle tube.

20 Claims, 9 Drawing Sheets

(51) Int. Cl.
*A01C 7/08* (2006.01)
*A01C 15/00* (2006.01)

(58) Field of Classification Search
CPC ....... A01C 7/084; A01C 15/006; A01C 7/042; A01C 15/005; A01C 15/00; A01C 7/04
See application file for complete search history.

(56) References Cited

U.S. PATENT DOCUMENTS

| | | |
|---|---|---|
| 4,164,669 A | 8/1979 | Knepler |
| 5,533,458 A | 7/1996 | Bergland et al. |
| 5,617,669 A | 4/1997 | Levey |
| 5,650,609 A | 7/1997 | Mertins et al. |
| 5,831,542 A | 11/1998 | Thomas et al. |
| 5,883,383 A | 3/1999 | Dragne |
| 6,209,466 B1 | 4/2001 | Wodrich |
| 6,332,413 B1 | 12/2001 | Stufflebeanm et al. |
| 7,152,540 B1 | 12/2006 | Sauder et al. |
| 7,426,894 B2 | 9/2008 | Peterson et al. |
| 7,472,660 B2 | 1/2009 | Mariman et al. |
| 8,631,749 B2 | 1/2014 | Sauder et al. |
| 8,869,629 B2 | 10/2014 | Noble et al. |
| 9,557,278 B1 | 1/2017 | Itagi et al. |
| 9,566,740 B2 | 2/2017 | Valola et al. |
| 9,575,210 B2 | 2/2017 | Liebich et al. |
| 9,936,632 B2 | 4/2018 | Bruns et al. |
| 2005/0204971 A1 | 9/2005 | VenHuizen |
| 2010/0116974 A1 | 5/2010 | Liu et al. |
| 2015/0144042 A1 | 5/2015 | Sheppard et al. |

FOREIGN PATENT DOCUMENTS

| | | |
|---|---|---|
| DE | 102016204468 A1 | 9/2017 |
| EP | 2055165 A1 | 5/2009 |

OTHER PUBLICATIONS

International Search Report & Written Opinion for PCT Application No. PCT/US2020/045034 dated Oct. 15, 2020; 14 pgs.
International Search Report & Written Opinion for PCT Application No. PCT/US2020/045023 dated Oct. 19, 2020; 14 pgs.

\* cited by examiner

PARTICLE DELIVERY ASSEMBLY OF AN AGRICULTURAL ROW UNIT

CROSS REFERENCE TO RELATED APPLICATION

This application claims priority from and the benefit of U.S. Provisional Application Ser. No. 62/891,755 entitled "PARTICLE DELIVERY ASSEMBLY OF AN AGRICULTURAL ROW UNIT", filed Aug. 26, 2019, which is hereby incorporated by reference in its entirety.

BACKGROUND

The present disclosure relates generally to a particle delivery assembly of an agricultural row unit.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. An agricultural product delivery system (e.g., including a metering system and a seed tube) is configured to deposit seeds and/or other agricultural products (e.g., fertilizer) into the trench. The opener/agricultural product delivery system is followed by closing discs that move displaced soil back into the trench and/or a packer wheel that packs the soil on top of the deposited seeds/other agricultural products.

Certain row units, or planting implements generally, include a seed storage area configured to store the seeds. The agricultural product delivery system is configured to transfer the seeds from the seed storage area into the trench. For example, the agricultural product delivery system may include a metering system that meters the seeds from the seed storage area into a seed tube. The seed tube may direct the seeds into the trench. Certain seed tubes include an optical sensor that detects each seed passing through the seed tube. Certain environments/operating conditions, such dusty environments and/or when debris passes between the seeds and the sensor, may interfere with seed detection by the optical sensor. Additionally, the location of the sensor may be limited to the end of the seed tube (e.g., an exit of the seed tube), which may limit a size and geometry of the end of the seed tube.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particle delivery assembly of an agricultural row unit includes a particle tube configured to receive a particle and to deliver the particle toward a trench in soil. The particle tube includes a first body portion, a second body portion, and a hinge coupled to the first body portion and to the second body portion. The hinge is configured to enable the first body portion and the second body portion to pivot relative to one another between an open position of the particle tube and a closed position of the particle tube.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
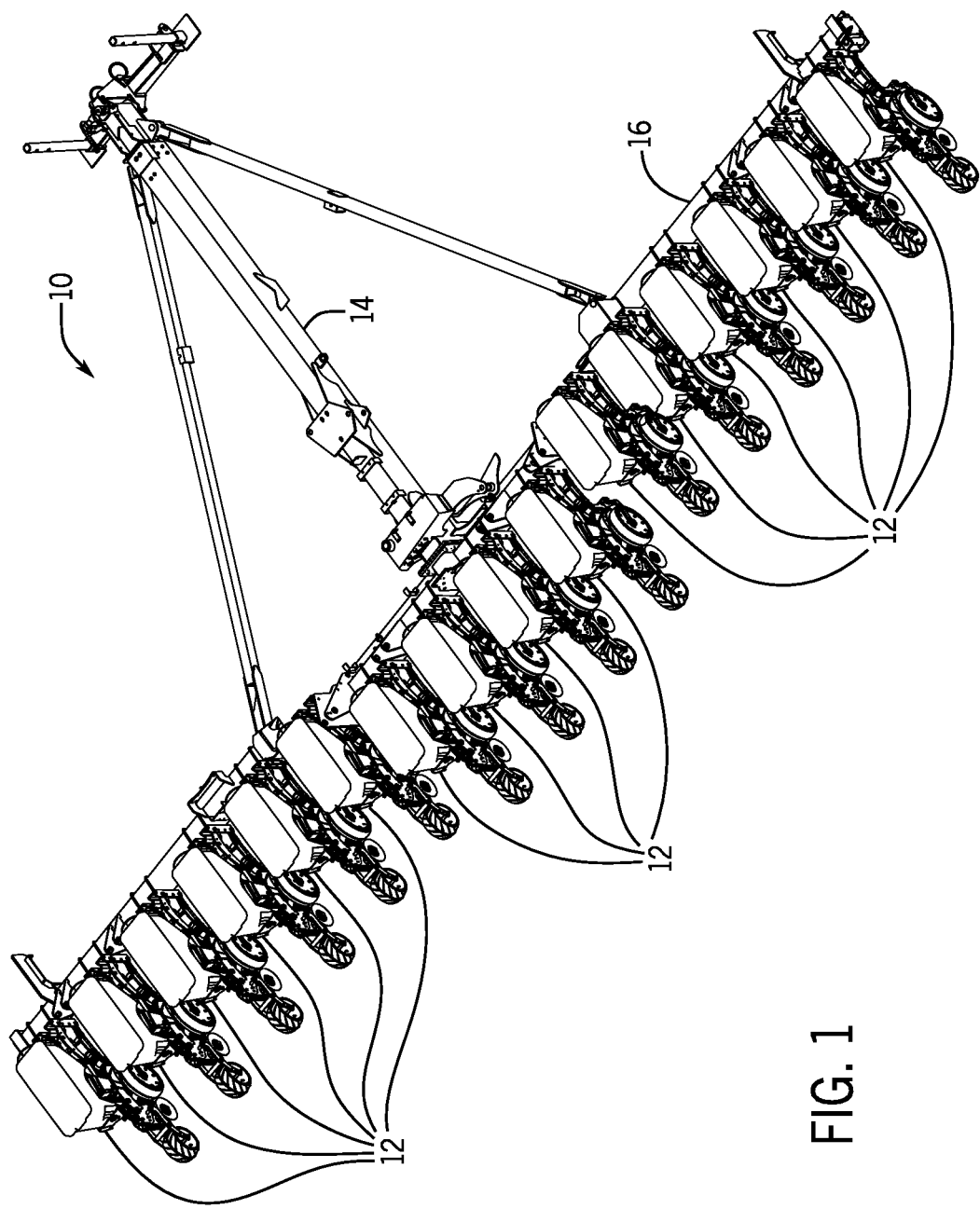
FIG. 1 is a perspective view of an embodiment of an agricultural implement having multiple row units distributed across a width of the agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a particle delivery assembly for a row unit of an agricultural implement. Certain agricultural implements include row units configured to deliver particles (e.g., seeds) into soil. For example, a particle distribution system may transport the particles from a storage tank of the agricultural implement to the row units (e.g., to a hopper assembly of each row unit or directly to a particle delivery assembly of each row unit), and/or the particles may be delivered from a hopper assembly of each row unit to a respective particle delivery assembly. Each particle delivery assembly may output the particles to a respective trench as the agricultural implement travels over the soil. As the particles are delivered to the trench, the speed of each particle, the application rate of the particles, and other measurements may be obtained via sensor(s) of the particle delivery assembly.

In certain embodiments, at least one row unit of the agricultural implement includes a particle delivery assembly configured to deliver the particles to a respective trench in the soil. The particle delivery assembly includes a sensor housing configured to house particle sensor(s) that are configured to detect the particles flowing through the particle delivery assembly. Additionally, the particle delivery assembly includes a first particle tube configured to receive the particles from a particle metering and singulation unit (e.g., including a metering wheel, a metering disc, etc.) configured to meter individual particles. The first particle tube may be coupled to the sensor housing, such that the sensor housing receives the particles from the first particle tube. The particle delivery assembly also includes a second particle tube coupled to the first particle tube. For example, the particle delivery assembly includes at least one coupling mechanism extending from the second particle tube, along the sensor housing, and coupling to the first particle tube. The second particle tube receives the particles from the sensor housing and delivers the particles to the trench in the soil. As such, the sensor housing is positioned along a flow path of the particles between the particle metering and singulation unit and the trench, thereby enabling detection of the particles along the flow path.

In certain embodiments, the first particle tube and the second particle tube are formed using an injection molding process. For example, each of the first particle tube and the second particle tube includes a first lateral portion (e.g., a first body portion), a second lateral portion (e.g., a second body portion), and a hinge (e.g., a living hinge) that couples the first lateral portion and the second lateral portion to one another. After being formed via the injection molding process, each of the first particle tube and the second particle tube is folded along the hinge such that the first lateral portion and the second lateral portion contact and engage one another. Each first lateral portion includes first connecting feature(s) (e.g., buckle(s)) that interface with corresponding second connecting feature(s) (e.g., hook(s)) of the respective second lateral portion to secure the respective particle tube in the folded/closed position. In some embodiments, the first particle tube and/or the second particle tube may include a first longitudinal portion and/or a second longitudinal portion, in place of or in addition to the first lateral portion and/or the second lateral portion, that are coupled to one another to at least partially form the first particle tube and/or the second particle tube. As such, each particle tube of the particle delivery assembly may be formed as a single piece and quickly and easily assembled into the particle delivery assembly.

With the foregoing in mind, the present embodiments relating to particle delivery assemblies may be utilized within any suitable agricultural implement. For example, FIG. 1 is a perspective view of an embodiment of an agricultural implement 10 having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a particle path (e.g., trench) within soil of a field. The row unit 12 may also include a particle delivery system (e.g., including a particle metering and singulation unit and the particle delivery assembly) configured to deposit particles (e.g., seeds, fertilizer, and/or other agricultural product(s)) into the particle path/trench. In addition, the row unit 12 may include closing disc(s) and/or a packer wheel positioned behind the particle delivery assembly. The closing disc(s) are configured to move displaced soil back into the particle path/trench, and the packer wheel is configured to pack soil on top of the deposited particles.

As each row unit 12 delivers the particles to the soil, certain information related to the particles may be stored, presented to an operator, analyzed, or a combination thereof, such as a size of each particle, relative placement of each particle within the soil, deposition rate of the particles, and other information. Accordingly, certain row units 12 include sensor(s) that may output signal(s) indicative of such information. Each row unit 12 may include a particle delivery assembly that accommodates/includes the sensor(s). For example, in certain embodiments, the particle delivery assembly includes a sensor housing configured to house the sensor(s). Additionally, the particle delivery assembly includes particle tubes that couple to one another and to the sensor housing. The particle tubes are configured to flow the particles through the sensor housing and into the trench in the soil.

Figure 2:
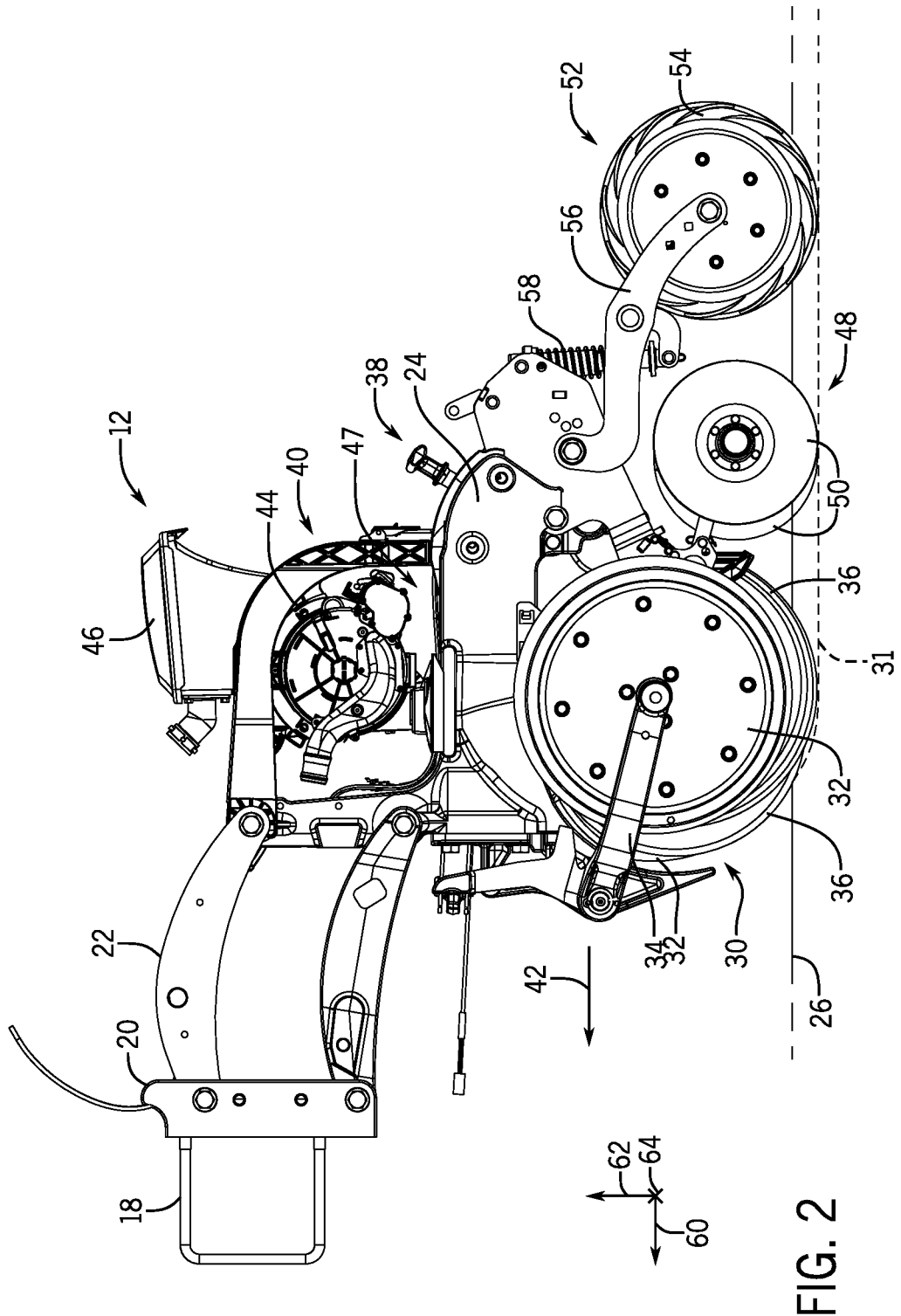
FIG. 2 is a side view of an embodiment of a row unit that may be employed on the agricultural implement of FIG. 1, in accordance with an aspect of the present disclosure.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a U-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in alternative embodiments, another suitable linkage assembly may extend between the bracket and the frame.

The row unit 12 includes an opener assembly 30 that forms a trench 31 in the soil surface 26 for particle deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate the trench 31 into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 includes a particle delivery system 40 configured to deposit particles (e.g., seeds, fertilizer, and/or other agricultural product(s)) into the trench 31 as the row unit 12 traverses the field along a direction of travel 42. As illustrated, the particle delivery system 40 includes a particle metering and singulation unit 44 configured to receive the particles (e.g., seeds) from a hopper assembly 46 (e.g., a particle storage area). In certain embodiments, the hopper assembly may be integrally formed with a housing of the particle metering and singulation unit. The hopper assembly 46 is configured to store the particles for subsequent metering by the particle metering and singulation unit 44 and delivery to the soil by a particle delivery assembly 47 of the particle delivery system 40. In certain embodiments, the particle metering and singulation unit 44 includes a disc configured to rotate to transfer the particles from the hopper assembly 46 toward the particle delivery assembly 47. In some embodiments, the particle metering and singulation unit may include other devices, in addition to or in place of the disc, to meter the seeds toward the particle delivery assembly. The particle delivery assembly 47 extends generally from the particle metering and singulation unit 44 toward the trench 31 formed in the soil and is configured to transfer the particles received from the particle metering and singulation unit 44 to the trench 31.

The opener assembly 30 and the particle delivery assembly 47 are followed by a closing assembly 48 that moves displaced soil back into the trench 31. In the illustrated embodiment, the closing assembly 48 includes two closing discs 50. However, in alternative embodiments, the closing assembly may include other closing devices (e.g., a single closing disc, etc.). In addition, in certain embodiments, the closing assembly may be omitted. In the illustrated embodiment, the closing assembly 48 is followed by a packing assembly 52 configured to pack soil on top of the deposited particles. The packing assembly 52 includes a packer wheel 54, an arm 56 that pivotally couples the packer wheel 54 to the frame 24, and a biasing member 58 configured to urge the packer wheel 54 toward the soil surface 26, thereby enabling the packer wheel to pack soil on top of the deposited particles (e.g., seeds and/or other agricultural product(s)). While the illustrated biasing member 58 includes a spring, in alternative embodiments, the biasing member may include another suitable biasing device, such as a hydraulic cylinder or a pneumatic cylinder, among others. In certain embodiments, the packing assembly may be omitted from the row unit. For purposes of discussion, reference may be made to a longitudinal axis or direction 60, a vertical axis or direction 62, and a lateral axis or direction 64. For example, the direction of travel 42 of the row unit 12 may be generally along the longitudinal axis 60.

Figure 3:
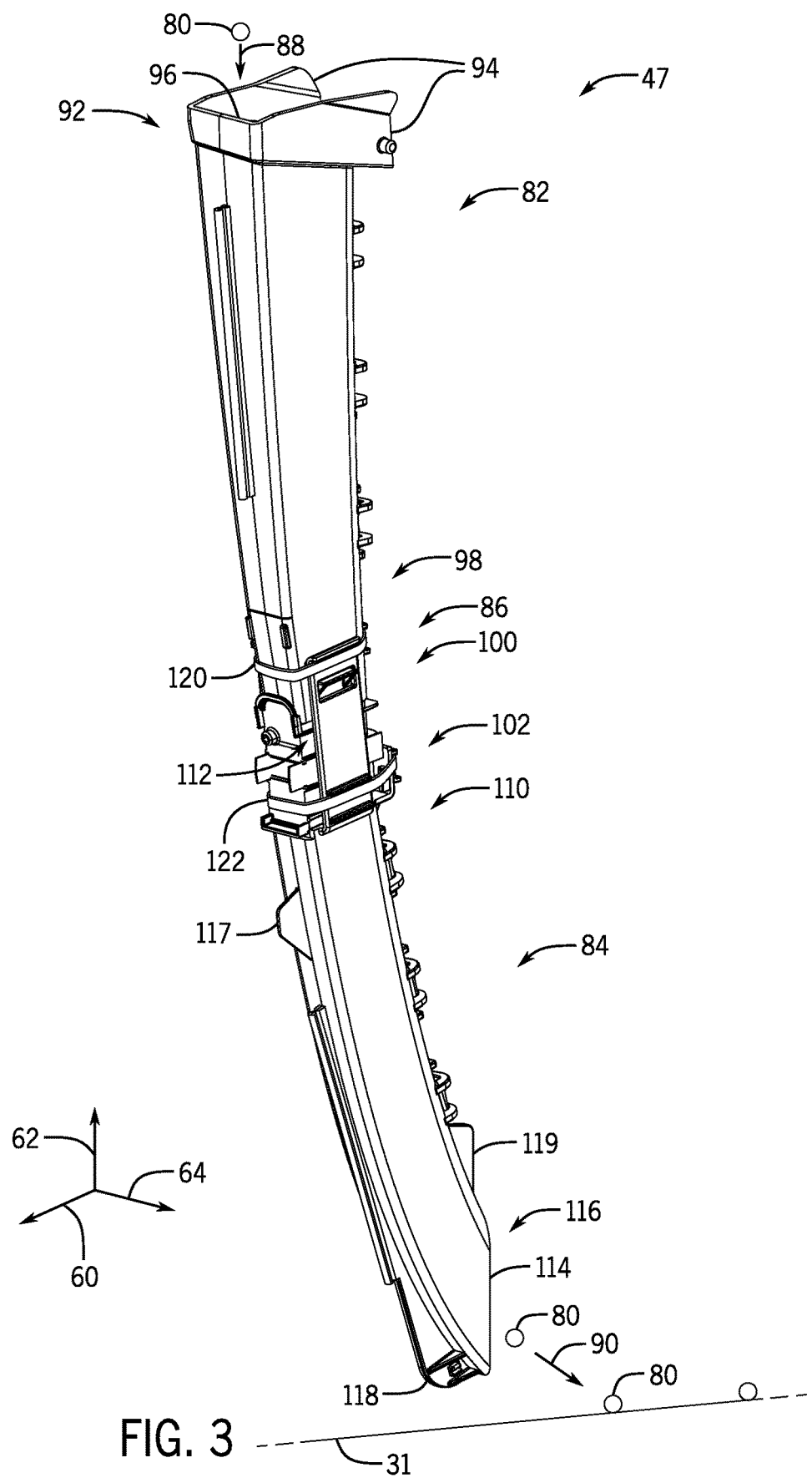
FIG. 3 is a perspective view of an embodiment of a particle delivery assembly that may be employed within the row unit of FIG. 2, in accordance with an aspect of the present disclosure.

FIG. 3 is a perspective view of an embodiment of the particle delivery assembly 47 that may be employed within the row unit of FIG. 2. As described above, the particle delivery assembly 47 is configured to receive particles 80 from the particle metering and singulation unit and to deliver the particles 80 to the trench 31. As illustrated, the particle delivery assembly 47 includes a first particle tube 82, a second particle tube 84, and a sensor housing 86 disposed between the first particle tube 82 and the second particle tube 84 along the vertical axis 62. The first particle tube 82 is configured to receive the particles 80 from the particle metering and singulation unit, as indicated by arrow 88, and to direct the particles 80 downwardly to the sensor housing 86. The sensor housing 86 is configured to receive the particles 80 from the first particle tube 82 and to direct the particles 80 downwardly to the second particle tube 84. The second particle tube 84 is configured to receive the particles 80 from the sensor housing 86 and to expel the particles 80 toward the trench 31, as indicated by arrow 90.

The first particle tube 82 has a first end 92 configured to interface with the particle metering and singulation unit. For example, brackets 94 disposed at the first end 92 of the first particle tube 82 may mount/couple to a housing of the particle metering and singulation unit and/or the frame of the row unit (e.g., to align the first end of the first particle tube with an outlet of the particle metering and singulation unit housing). Additionally, an inlet 96 formed at the first end 92 of the first particle tube 82 is configured to receive the particles 80 from the particle metering and singulation unit. The first particle tube 82 has a second end 98 disposed opposite the first end 92 and engaged with the sensor housing 86. The first particle tube 82 is configured to output the particles 80 through the second end 98 (e.g., through an outlet formed in the second end 98) and into the sensor housing 86.

The sensor housing 86 has a first end 100 engaged with the second end 98 of the first particle tube 82. Additionally, the sensor housing 86 has a second end 102 disposed opposite the first end 100 and engaged with (e.g., abutting) the second particle tube 84. The sensor housing 86 is configured to receive the particles 80 from the first particle tube 82 at the first end 100 and to output the particles 80 through the second end 102 into the second particle tube 84.

Additionally, the sensor housing 86 is configured to house sensor(s) configured to detect/sense the particles 80 as the particles 80 pass through the sensor housing 86. For example, the sensor housing 86 may include a metallic layer (e.g., a metallic exterior layer) to enable an electromagnetic sensor to sense the particles 80 via microwaves (e.g., the metallic layer may serve as a boundary to cause the microwaves to reflect). The metallic layer may keep the microwaves within the sensor housing 86, such that only objects (e.g., the particles 80) within sensor housing 86 (e.g., passing through the microwaves) are detected. In certain embodiments, the sensor housing 86 may include a plastic layer (e.g., a plastic layer that is interior to the metallic exterior layer) to facilitate the flow of the particles 80 through the sensor housing 86 and/or to provide a softer material surrounding the particles 80 along the flow path of the particles 80 through the particle delivery assembly 47. The microwaves may pass through the plastic interior layer and may be reflected back inwardly by the metallic exterior layer.

The second particle tube 84 has a first end 110 engaged with (e.g., abutting) the second end 102 of the sensor housing 86 and coupled to coupling mechanisms 112. As described in greater detail below, the coupling mechanisms 112 extend from the first end 110 of the second particle tube 84 and around/along the sensor housing 86. In certain embodiments, the second particle tube may include the coupling mechanisms. The coupling mechanisms 112 are coupled to the second end 98 of the first particle tube 82 to couple the second particle tube 84 to the first particle tube 82 (e.g., the coupling mechanisms 112 extend between the first particle tube 82 and the second particle tube 84) and to secure the sensor housing 86 between the first particle tube 82 and the second particle tube 84 along the vertical axis 62. In certain embodiments, the first end of the second particle tube may be coupled to the second end of the sensor housing and/or other portion(s) of the sensor housing. Additionally, an outlet 114 formed in a second end 116 of the second particle tube 84 (e.g., the second end 116 substantially opposite the first end 110) is configured to expel the particles 80 to the trench 31, as indicated by arrow 90. As used herein, the end of the particle tube (e.g., the first end 92 of the first particle tube 82, the second end 98 of the first particle tube 82, the first end 110 of the second particle tube 84, the second end 116 of the second particle tube 84, or a combination thereof) and/or the end of the sensor housing (e.g., the first end 100 of the sensor housing 86 and/or the second end 102 of the sensor housing 86) may refer to an end portion of the respective component (e.g., the particle tube or the sensor housing) and not necessarily to an actual end (e.g., a tip, a maximum extent of the component along an axis, etc.) of the respective component.

The second particle tube 84 also includes a first standoff 117, a second standoff 118, and a third standoff 119 configured to maintain a relative position of the second particle tube 84 of the particle delivery assembly 47 within the row unit (e.g., relative to the frame of the row unit). For example, the first standoff 117, the second standoff 118, the third standoff 119, or a combination thereof, may abut other portions of the row unit, such as other brackets, the row unit frame, etc., to substantially block movement of the particle delivery assembly 47 along the longitudinal axis 60 within the row unit. In certain embodiments, the particle delivery assembly may include more or fewer standoffs along the first particle tube, the second particle tube, the sensor housing, or a combination thereof (e.g., to block movement along the longitudinal axis, the vertical axis, the lateral axis, or a combination thereof).

As illustrated, the particle delivery assembly 47 includes a first cable tie 120 wrapped around the first particle tube 82, the sensor housing 86, and the coupling mechanisms 112 of the second particle tube 84 to at least partially secure the coupling mechanisms 112 around the sensor housing 86. Additionally, the particle delivery assembly 47 includes a second cable tie 122 wrapped around the sensor housing 86 and the coupling mechanisms 112 to at least partially secure the coupling mechanisms 112 along the sensor housing 86. The first cable tie 120 and/or the second cable tie 122 may be secured around the sensor housing 86 and the coupling mechanisms 112 after assembly/engagement of the sensor housing 86 with the first particle tube 82 and the second particle tube 84. In certain embodiments, the particle delivery assembly may include more or fewer cables ties (e.g., one cable tie, three cable ties, four cable ties, five cable ties, etc.) to at least partially secure the coupling mechanisms along the sensor housing. The first cable tie 120 and the second cable tie 122 may be formed of the same or different materials, which may include plastic and/or metal. Additionally, each of the first cable tie 120 and/or the second cable tie 122 may include integrated locking mechanism(s) to secure the first cable tie 120 and the second cable tie 122 around the other components of the particle delivery assembly 47.

Figure 4:
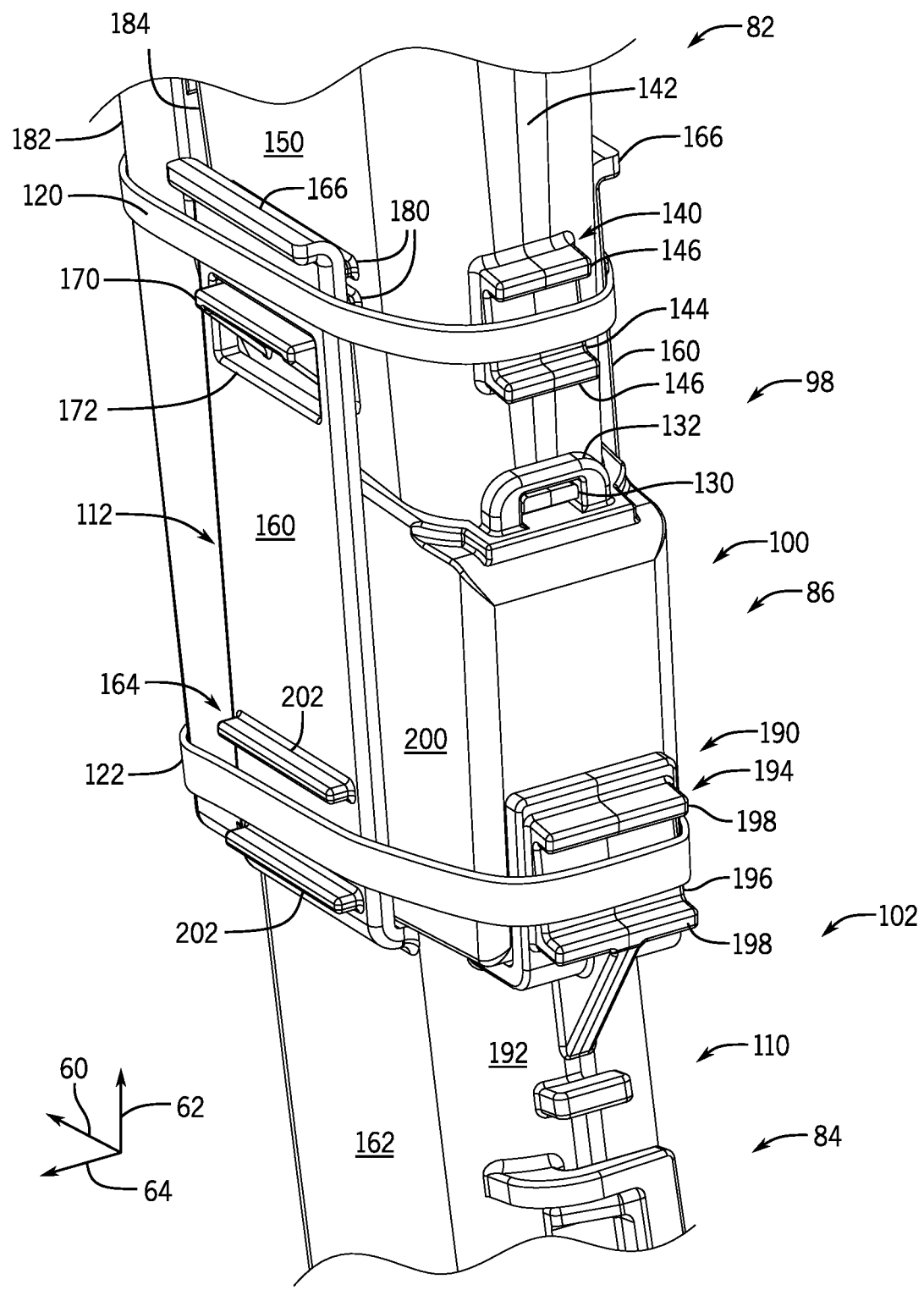
FIG. 4 is a perspective view of a sensor housing coupled to a first particle tube and a second particle tube of the particle delivery assembly of FIG. 3, in accordance with an aspect of the present disclosure.

FIG. 4 is a perspective view of the sensor housing 86 coupled to the first particle tube 82 and the second particle tube 84 of the particle delivery assembly 47 of FIG. 3. The second end 98 of the first particle tube 82 extends into the first end 100 of the sensor housing 86 to at least partially secure the first particle tube 82 to the sensor housing 86. For example, the first particle tube 82 extends into the sensor housing 86 about two millimeters ("mm") in the illustrated embodiment. In other embodiments, the first particle tube may extend into the sensor housing a greater or lesser distance, such as one mm, three mm, four mm, six mm, between one mm and three mm, between one mm and five mm, between two mm and seven mm, or other suitable distances. In certain embodiments, the second end of the first particle tube may generally abut the first end of the sensor housing, and/or the first end of the sensor housing may extend into the second end of the first tube.

Additionally, the first particle tube 82 includes a protrusion 130 protruding longitudinally (e.g., generally along the longitudinal axis 60) from the second end 98 of the first particle tube 82 through a loop 132 of the sensor housing 86. The loop 132 extends vertically (e.g., generally along the vertical axis 62) from the first end 100 of the sensor housing 86. The protrusion 130 of the first particle tube 82 extending through the loop 132 of the sensor housing 86 at least partially secures the first particle tube 82 to the sensor housing 86 (e.g., the protrusion 130 is a securing protrusion). In certain embodiments, the first particle tube and/or the second particle tube may include additional protrusions that extend through respective loops of the sensor housing. In some embodiments, the protrusion of the first particle tube and/or the loop of the sensor housing may be omitted, the sensor housing may include a protrusion that extends through a loop of the first particle tube (e.g., the protrusion may extend generally vertically from the sensor housing through the loop that extends generally longitudinally from the first particle tube), the first particle tube and/or the sensor housing may include other type(s) of connector(s) configured to connect/coupled the first particle tube and the sensor housing (e.g., a buckle and hook configuration, a weld, etc.), or a combination thereof.

As described above, the particle delivery assembly 47 includes the first cable tie 120 wrapped around the first particle tube 82, the sensor housing 86, and the coupling mechanisms 112 to secure the first particle tube 82 to the second particle tube 84 (e.g., via the coupling mechanisms 112 coupled to the second particle tube 84) and to secure the sensor housing 86 between the first particle tube 82 and the second particle tube 84. Additionally, the particle delivery assembly 47 includes the second cable tie 122 wrapped around the second particle tube 84, the sensor housing 86, and the coupling mechanisms 112 to secure the second particle tube 84 and the coupling mechanisms 112 to the sensor housing 86. Each of the first particle tube 82 and the second particle tube 84 includes features to facilitate maintaining the vertical/relative position of the first cable tie 120 along the first particle tube 82, the second particle tube 84, the sensor housing 86, and the coupling mechanisms 112. In the illustrated embodiment, the first particle tube 82 includes a channel 140 extending longitudinally (e.g., along the longitudinal axis 60) outwardly from a first longitudinal side 142 of the first particle tube 82. The channel 140 is formed from a base 144 and sides 146 extending longitudinally outwardly from the base 144. As illustrated, the first cable tie 120 extends over the base 144 and between the sides 146, such that the sides 146 substantially block vertical movement (e.g., along the vertical axis 62) of the first cable tie 120 along the first longitudinal side 142 of the first particle tube 82. In certain embodiments, the channel may be omitted from the first longitudinal side of the first particle tube, or the first particle tube may include additional channels (e.g., on the first longitudinal side, on a second longitudinal side, on the lateral side, or a combination thereof) configured to secure the first cable tie vertically along the first particle tube (e.g., generally along the vertical axis).

Additionally, the first cable tie 120 extends over the coupling mechanisms 112 of the second particle tube 84 on the lateral sides 150 of the first particle tube 82 (e.g., over first and second coupling mechanisms 112). Each coupling mechanism 112 includes a flap 160 extending from a lateral side 162 of the second particle tube 84, a channel 164 formed along the flap 160, and a lip 166 extending from the flap 160 (e.g., along the lateral axis 64). The first particle tube 82 includes a ledge 170 extending from each lateral side 150 (e.g., along the lateral axis 64) and through an aperture 172 formed within a respective flap 160. The first cable tie 120 extends over each flap 160 and between the respective lip 166 and the respective ledge 170, which extends through the respective flap 160. The lip 166 and the ledge 170 are configured to substantially block vertical movement (e.g., along the vertical axis 62) of the first cable tie 120 along the respective lateral side 150 of the first particle tube 82 and along the respective coupling mechanism 112. In certain embodiments, only one coupling mechanism may include the lip configured to substantially block vertical movement of the first cable tie (e.g., one lip may be omitted), or the lip may be omitted from both coupling mechanisms.

The first particle tube 82 includes protrusions 180 extending laterally outwardly (e.g., along the lateral axis 64; support protrusions) from each lateral side 150 of the first particle tube 82 between the lateral side 150 and the flap 160 of the respective coupling mechanism 112. The protrusions 180 are configured to support each flap 160 while the first cable tie 120 is wrapped/bound around the flap 160 and the first particle tube 82 (e.g., the protrusions 180 are support protrusions). As illustrated, the first particle tube 82 includes two protrusions 180 on each lateral side 150 of the first particle tube 82. In other embodiments, the first particle tube may include more or fewer protrusions on each lateral side of the first particle tube (e.g., zero protrusions, one protrusion, three protrusions, four protrusions, etc.). Additionally, as illustrated, the protrusions 180 are disposed adjacent to and extend parallel to the ledge 170 of the first particle tube 82. In other embodiments, the protrusions may be disposed in a different arrangement on at least one lateral side of the first particle tube (e.g., vertically, diagonally, etc.).

The first end 100 of the sensor housing 86 includes an arm 182 extending generally vertically (e.g., along the vertical axis 62) along a second longitudinal side 184 of the first particle tube 82. The first cable tie 120 is wrapped around the arm 182 to at least partially secure the sensor housing 86 to the first particle tube 82. As such, the first cable tie 120 extends through the channel 140 of the first particle tube 82, around each flap 160, between the lip 166 of the flap 160 and the respective ledge 170 of the first particle tube 82, and around the arm 182 of the sensor housing 86 to secure the first particle tube 82 to the second particle tube 84 and to secure the sensor housing 86 between the first particle tube 82 and the second particle tube 84.

Each of the second particle tube 84 and the sensor housing 86 includes features to facilitate maintaining the vertical/relative position (e.g., along the vertical axis 62) of the second cable tie 122 along the second particle tube 84 and the sensor housing 86. In the illustrated embodiment, the second particle tube 84 includes an ear 190 extending generally vertically (e.g., along the vertical axis 62) from the first end 110 of the second particle tube 84, extending generally longitudinally (e.g., along the longitudinal axis 60) from a longitudinal side 192 of the second particle tube 84, and extending along the sensor housing 86. The ear 190 forms a channel 194 extending along the lateral axis 64. The channel 194 is formed from a base 196 and sides 198 extending longitudinally outwardly (e.g., along the longitudinal axis 60) from the base 196. As illustrated, the second cable tie 122 extends over the base 196 and between the sides 198. The sides 198 are configured to substantially block vertical movement of the second cable tie 122 along the ear 190 and along the longitudinal side 192 of the second particle tube 84. In certain embodiments, the ear may be omitted from the second particle tube, or the second particle tube may include additional ears extending from the first end of the second particle tube along the sensor housing (e.g., from the longitudinal side(s) of the second particle tube and/or the lateral side(s) of the second particle tube) that are configured to at least partially secure the sensor housing at the first end of the second particle and/or to provide respective channels for the second cable tie.

Additionally, the second cable tie 122 extends over the coupling mechanisms 112 of the second particle tube 84 on the lateral sides 200 of the sensor housing 86 (e.g., over first and second coupling mechanisms 112). As described above, each coupling mechanism 112 includes the flap 160 and the channel 164 formed along the flap 160. For example, each channel 164 is formed from sides 202 extending laterally outwardly (e.g., along the lateral axis 64) from the flap 160 and away from the respective lateral side 200 of the sensor housing 86. The second cable tie 122 extends over each flap 160 and through the respective channel 164 (e.g., between the sides 202 of the channel 164), such that the channel 164 substantially blocks vertical movement of the second cable tie 122 along the flap 160 of the second particle tube 84 and along the coupling mechanism 112 generally. In certain embodiments, only one coupling mechanism may include the channel configured to substantially block vertical movement of the second cable tie (e.g., one channel may be omitted), or the channel may be omitted from both coupling mechanisms. As such, the second cable tie 122 extends along the ear 190 of the second particle tube 84, along each flap 160, through the respective channel 164, and along the second end 102 of the sensor housing 86, to at least partially secure the second particle tube 84 to the sensor housing 86.

As illustrated, the particle delivery assembly 47 includes a respective coupling mechanism 112 extending along each lateral side 200 of the sensor housing 86 and each lateral side 150 of the first particle tube 82 (e.g., two coupling mechanisms 112). In certain embodiments, the particle delivery assembly may include more or fewer coupling mechanisms (e.g., one coupling mechanism, three coupling mechanisms, four coupling mechanisms, five coupling mechanisms, six coupling mechanisms, etc.). In some embodiments, the coupling mechanism(s) may extend from the first longitudinal side of the second particle tube (e.g., in addition to or in place of the ear) and/or from a second longitudinal side of the second particle tube and may be coupled to the first particle tube. In certain embodiments, the coupling mechanisms may be coupled to and extend from the first particle tube and engaged with ledges extending from the second particle tube (e.g., from lateral sides of the second particle tube) to couple the first particle tube to the second particle tube (e.g., in place of or in addition to the coupling mechanisms extending from the second particle tube and engaged with the ledges extending from the first particle tube). As such, the coupling mechanisms may extend between the first particle tube and the second particle tube (e.g., from the first particle tube to the second particle tube and/or from the second particle tube to the first particle tube) to couple the first particle tube to/with the second particle tube.

Contact between the first particle tube 82 and the sensor housing 86 (e.g., between the second end 98 of the first particle tube 82 and the first end 100 of the sensor housing 86) blocks upward movement of the sensor housing 86. Additionally, contact between the sensor housing 86 and the second particle tube 84 (e.g., between the second end 102 of the sensor housing 86 and the first end 110 of the second particle tube 84) blocks downward movement of the sensor housing 86. Further, contact between the sensor housing 86 and each coupling mechanism 112 (e.g., between each lateral side 200 of the sensor housing 86 and the flap of the respective coupling mechanism) blocks lateral movement of the sensor housing 86.

Figure 5:
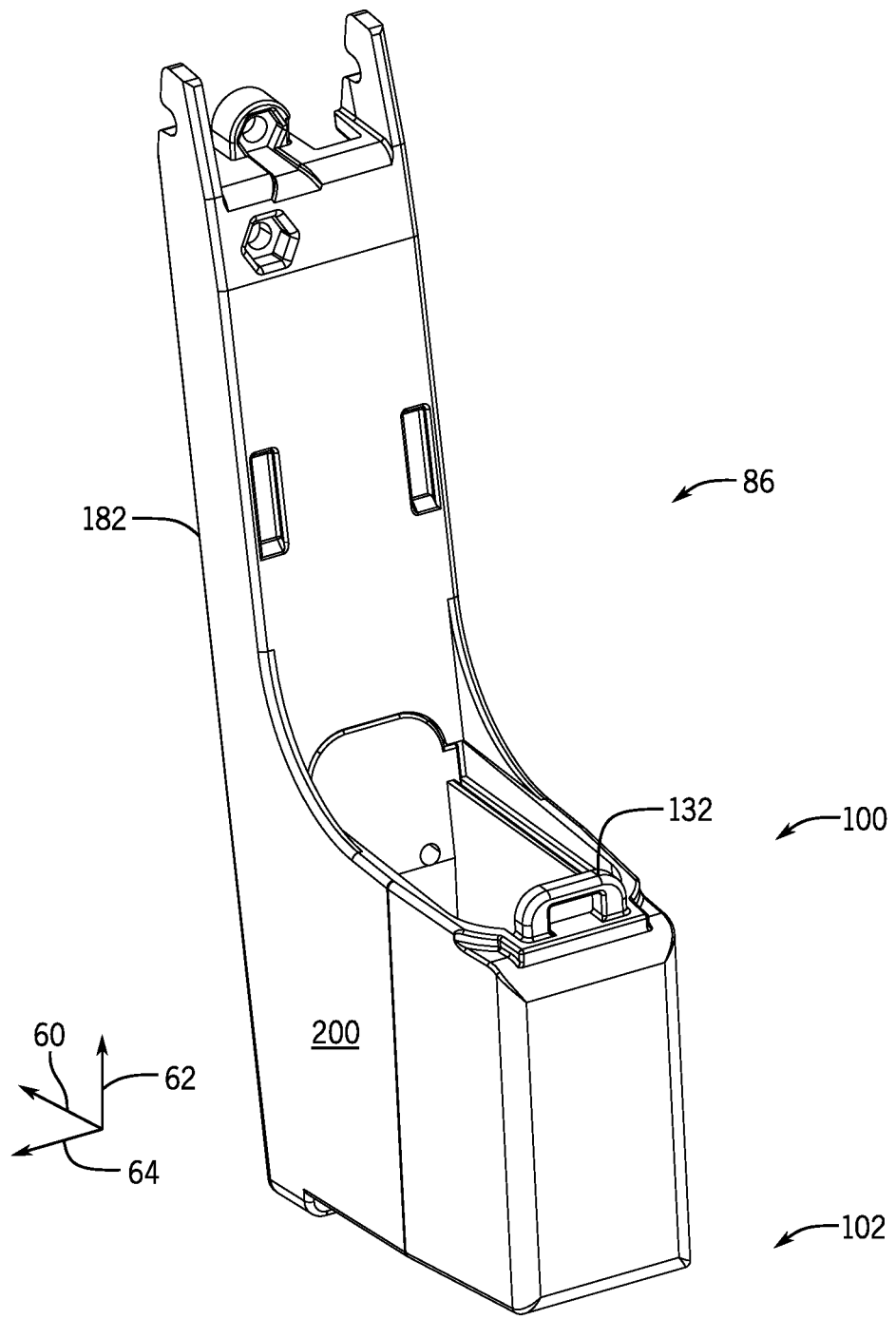
FIG. 5 is a perspective view of the sensor housing of the particle delivery assembly of FIG. 3, in accordance with an aspect of the present disclosure.

FIG. 5 is a perspective view of the sensor housing 86 of the particle delivery assembly of FIG. 3. As described above, the first end 100 of the sensor housing 86 is configured to engage/interface with the first particle tube (e.g., the first particle tube extends into first end 100 of the sensor housing 86, and the protrusion of the first particle tube extends into the loop 132 of the sensor housing 86), and the second end 102 of the sensor housing 86 is configured to engage/interface with the second particle tube (e.g., the second particle tube abuts the second end 102 of the sensor housing 86). The sensor housing 86 is configured to receive the particles from the first particle tube and to direct the particles 80 downwardly to the second particle tube. Additionally, the sensor housing 86 is configured to house sensor(s) configured to detect/sense the particles 80 as the particles 80 pass through the sensor housing 86.

Figure 6:
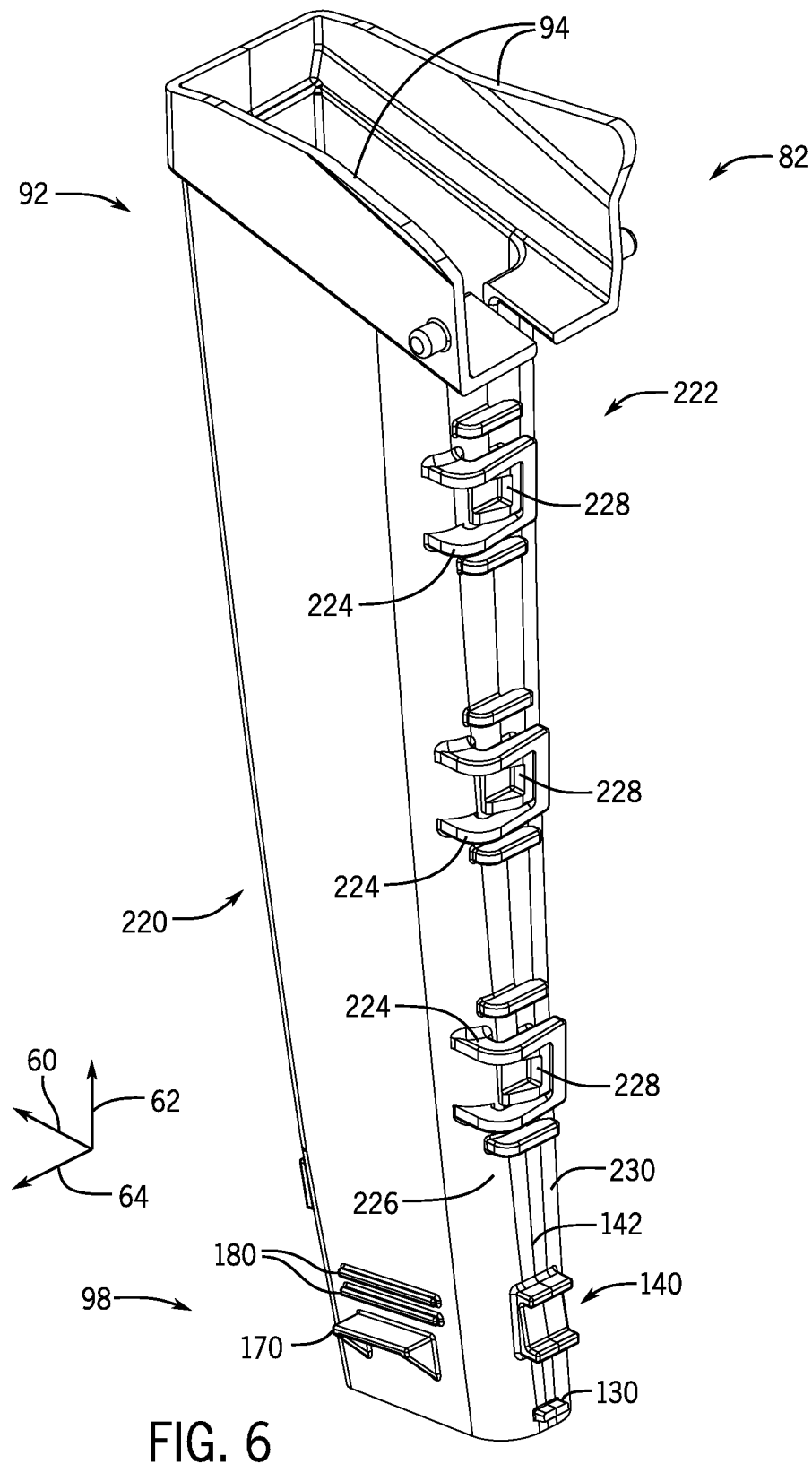
FIG. 6 is a perspective view of the first particle tube of the particle delivery assembly of FIG. 3 in a closed position, in accordance with an aspect of the present disclosure.

FIG. 6 is a perspective view of the first particle tube 82 of the particle delivery assembly of FIG. 3 in a closed position. As described above, the first particle tube 82 is configured to receive the particles from the particle metering and singulation unit at the first end 92 of the first particle tube 82 and to deliver the particles to the sensor housing at the second end 98 of the first particle tube 82. The first particle tube 82 includes a first lateral portion 220 (e.g., a first body portion) and a second lateral portion 222 (e.g., a second body portion), which are coupled to one another. In the illustrated embodiment, the first lateral portion 220 includes connecting features 224 extending from a first longitudinal end 226 of the first lateral portion 220. The connecting features 224 of the first lateral portion 220 are engaged with corresponding connecting features 228 of the second lateral portion 222, which extend from a first longitudinal end 230 of the second lateral portion 222. As illustrated, the first lateral portion 220 includes three connecting features 224, and the second lateral portion 222 includes three corresponding connecting features 228. In other embodiments, the first lateral portion and/or the second lateral portion may include more or fewer connecting features (e.g., one connecting feature, two connecting features, four connecting features, six connecting features, etc.). In some embodiments, the first particle tube may include a first longitudinal portion and/or a second longitudinal portion, in place of or in addition to the first lateral portion and/or the second lateral portion, that are coupled to one another to at least partially form the first particle tube.

Additionally, as illustrated, each connecting feature 224 of the first lateral portion 220 includes a buckle, and each corresponding connecting feature 228 of the second lateral portion 222 includes a hook. The connecting features 224 (e.g., the buckles) of the first lateral portion 220 are configured to engage and receive the corresponding connecting features 228 (e.g., the hooks) of the second lateral portion 222 to secure the first particle tube 82 in the closed position. In certain embodiments, the connecting features of the first lateral portion and/or the second lateral portion may include other elements and/or mechanisms configured to secure the first particle tube in the closed position, such as hook(s), magnet(s), adhesive, hook-and-loop fastener(s), clip(s), other suitable feature(s), or a combination thereof. For example, the connecting features of the first lateral portion may include hooks, and the corresponding connecting features of the second lateral portion may include buckles configured to receive the hooks to secure the first particle tube in the closed position. In some embodiments, the first lateral portion of the first particle tube and the second lateral portion of the first particle tube may be coupled to one another via tool-based elements, such as screw(s), rivet(s), bolt(s), etc. In certain embodiments, the first lateral portion of the first particle tube and the second lateral portion of the first particle tube may be coupled to one another via a plastic weld and/or other securing/coupling methods. For example, the first longitudinal end of the first lateral portion of the first particle tube may be plastically welded to the first longitudinal end of the second lateral portion of the first particle tube to secure the first particle tube in the closed position.

The first longitudinal end 226 of the first lateral portion 220 and the first longitudinal end 230 of the second lateral portion 222 form the first longitudinal side 142 of the first particle tube 82. As described in greater detail below, a hinge (e.g., a living hinge) is positioned at a second longitudinal side of the first particle tube 82. The hinge is configured to couple the first lateral portion 220 to the second lateral portion 222 and to enable the first lateral portion 220 and the second lateral portion 222 to pivot relative to one another.

The first particle tube 82 and the components thereof (e.g., the first lateral portion 220, the second lateral portion 222, and the hinge) may be formed as a single component via an injection molding process. For example, the first particle tube 82 may initially be formed in the open position described below and may include the first lateral portion 220, the second lateral portion 222, and the hinge as a single, continuous component. The first particle tube 82 may be folded along the hinge such that the connecting features 224 of the first lateral portion 220 move toward and engage the corresponding connecting features 228 of the second lateral portion 222. After the connecting features 224 of the first lateral portion 220 engage the corresponding connecting features 228 of the second lateral portion 222, the first particle tube 82 is secured in the illustrated closed position and is configured to direct the particles from the particle metering and singulation unit toward the sensor housing. Additionally, the first particle tube 82 includes, via the injection molding process, the features enabling coupling to the second particle tube and to the sensor housing, such as the channel 140 and the ledges 170. In certain embodiments, the first particle tube, or portion(s) thereof, may be molded via a mandrel. For example, the first particle tube may be extruded/pulled from plastic stock material and each end of the first particle tube (e.g., the extruded first particle tube) may be fastened closed via one or more of the methods described herein.

Figure 7:
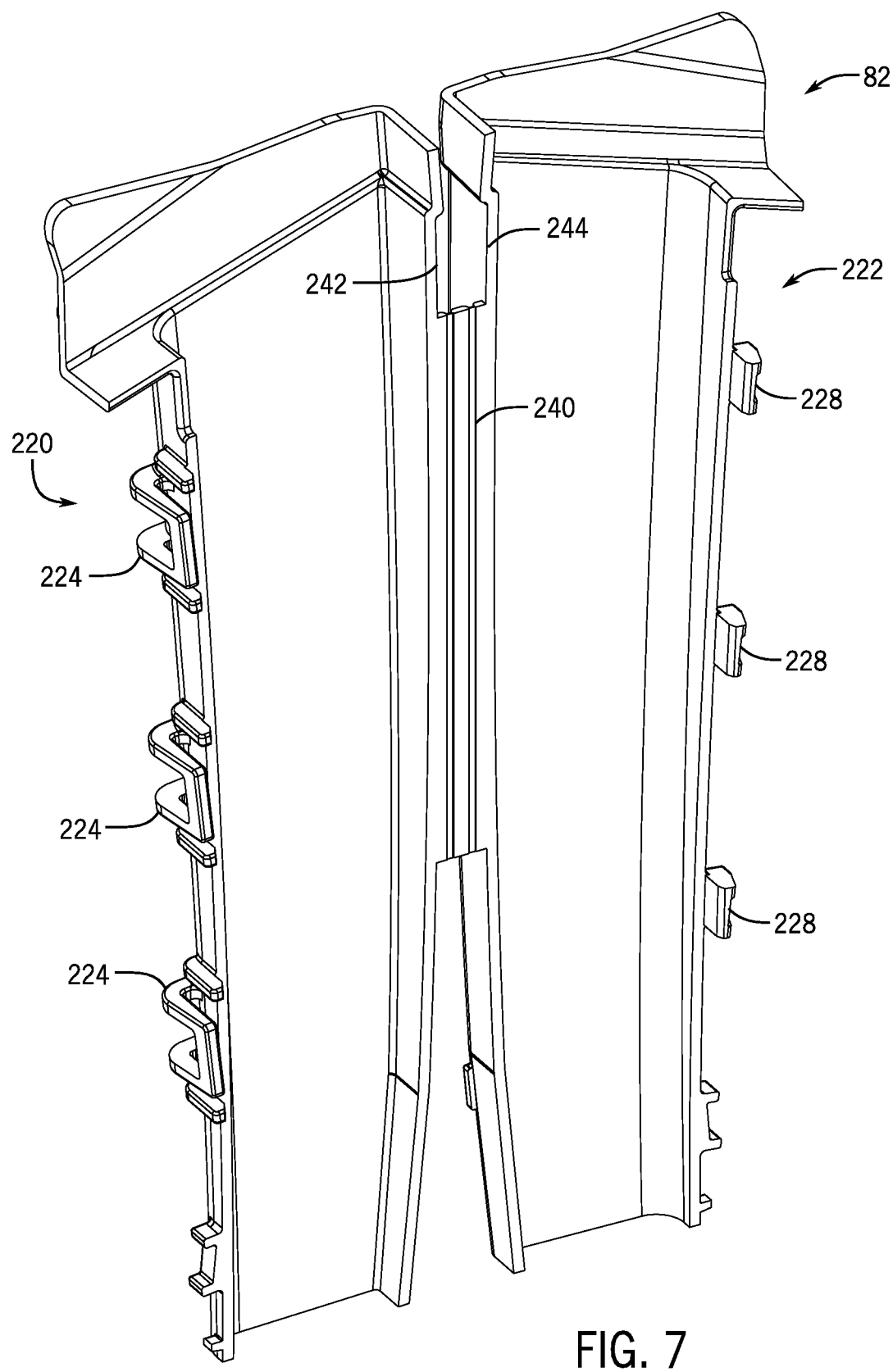
FIG. 7 is a perspective view of the first particle tube of FIG. 6 in an open position, in accordance with an aspect of the present disclosure.

FIG. 7 is a perspective view of the first particle tube 82 of FIG. 6 in an open position. As illustrated, the first particle tube 82 includes the first lateral portion 220, the second lateral portion 222, and a hinge 240 coupled to and adjoining the first lateral portion 220 and the second lateral portion 222. In the illustrated embodiment, the hinge 240 is coupled to (e.g., integrally formed with) a second longitudinal end 242 of the first lateral portion 220 and to (e.g., integrally formed with) a second longitudinal end 244 of the second lateral portion 222. The first lateral portion 220 and the second lateral portion 222 are configured to move/pivot about the hinge 240 to move the first particle tube 82 from the open position of FIG. 7 to the closed position of FIG. 6 (e.g., the connecting features 224 of the first lateral portion 220 move toward and engage the corresponding connecting features 228 of the second lateral portion 222 to secure the first particle tube in the closed position).

As described above, the first lateral portion 220, the second lateral portion 222, and the hinge 240 may be formed as a single, continuous component via the injection molding process. Additionally, the first lateral portion 220, the second lateral portion 222, and the hinge 240 may be formed from a single material, such as polypropylene or another suitable plastic. Further, the hinge 240 is a living hinge integrally formed with the first lateral portion 220 and the second lateral portion 222. As illustrated, the hinge 240 is a single hinge coupled to and adjoining the first lateral portion 220 of the first particle tube 82 and the second lateral portion 222 of the first particle tube 82. In other embodiments, the first particle tube may include multiple hinges (e.g., two hinges, three hinges, fives hinges, etc.) coupled to and adjoining the first lateral portion of the first particle tube and the second lateral portion of the first particle tube.

In other embodiments, the first lateral portion of the first particle tube and the second lateral portion of the first particle tube may be formed separately, and/or the hinge may be integrally formed with only the first lateral portion or only the second lateral portion. The lateral portion (e.g., the first lateral portion of the first particle tube or the second lateral portion of the first particle tube) having the integrally formed hinge may subsequently be coupled to the other lateral portion to form the first particle tube (e.g., via plastic welding, connecting feature(s), tool-based elements, other connecting mechanism(s)/method(s), or a combination thereof). In some embodiments, the hinge may be formed as a separate component that is subsequently coupled to both the first lateral portion of the first particle tube and the second lateral portion of the first particle tube (e.g., via plastic welding, connecting feature(s), tool-based elements, other connecting mechanism(s)/method(s), or a combination thereof). In certain embodiments, the hinge may be omitted, and the first lateral portion of the first particle tube and the second lateral portion of the first particle tube may be coupled along their respective second longitudinal sides via plastic welding, connecting feature(s), tool-based elements, other connecting mechanism(s)/method(s), or a combination thereof.

Figure 8:
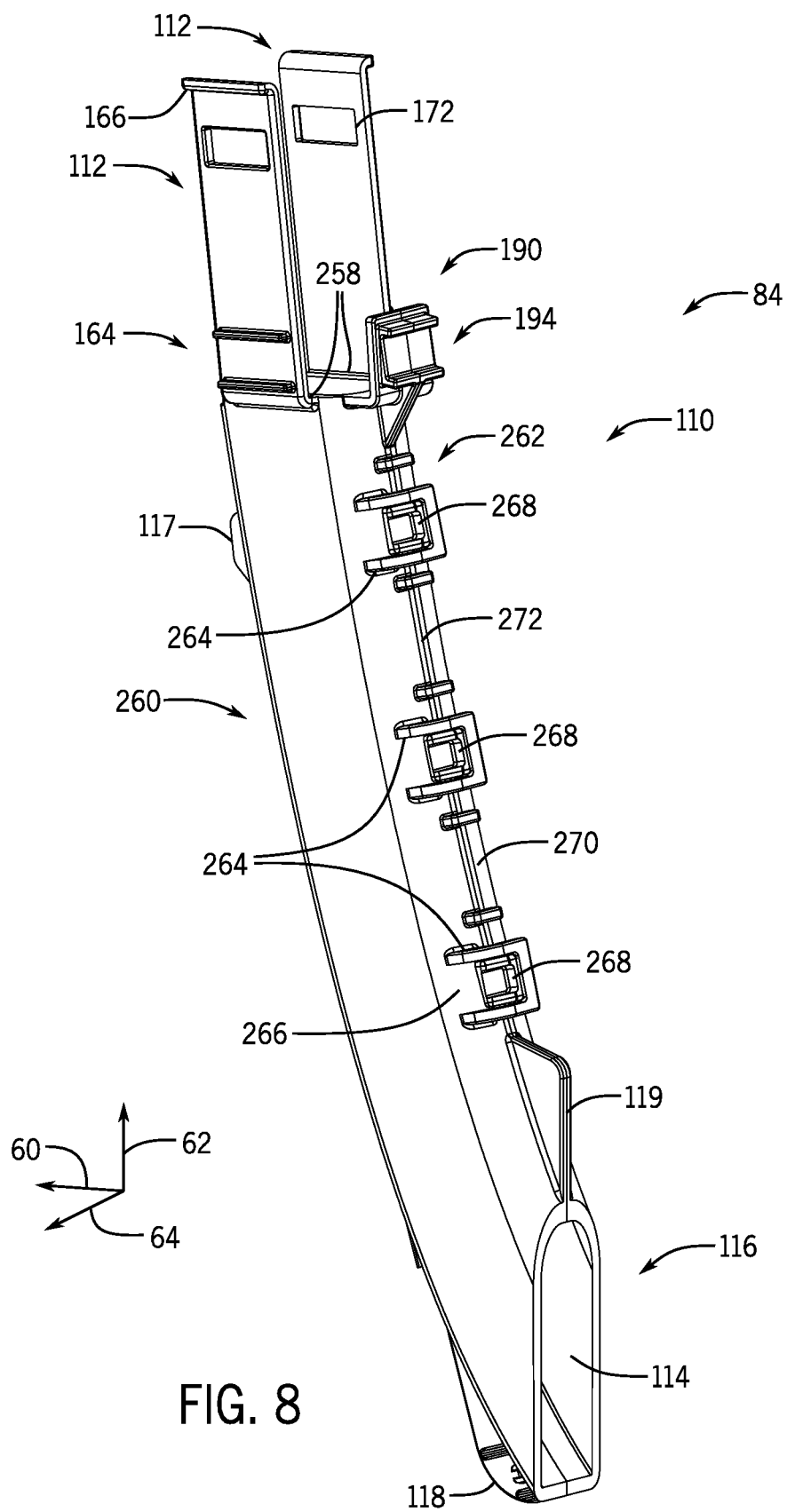
FIG. 8 is a perspective view of the second particle tube of the particle delivery assembly of FIG. 3 in a closed position, in accordance with an aspect of the present disclosure.

FIG. 8 is a perspective view of the second particle tube 84 of the particle delivery assembly of FIG. 3 in a closed position. As described above, the second particle tube 84 is configured to receive the particles from the sensor housing at the first end 110 of the second particle tube 84 and to deliver the particles to the trench in the soil via the second end 116 of the second particle tube 84. For example, a surface 258 (e.g., a top surface) of the first end 110 of the second particle tube 84 is configured to abut the second end of the sensor housing and to enable the second particle tube 84 to receive the particles from the sensor housing. The second particle tube 84 includes a first lateral portion 260 (e.g., a first body portion) and a second lateral portion 262 (e.g., a second body portion) coupled to one another. In the illustrated embodiment, the first lateral portion 260 includes connecting features 264 extending from a first longitudinal end 266 of the first lateral portion 260. The connecting features 264 of the first lateral portion 260 are engaged with corresponding connecting features 268 of the second lateral portion 262, which extend from a first longitudinal end 270 of the second lateral portion 262. As illustrated, the first lateral portion 260 includes three connecting features 264, and the second lateral portion 262 includes three corresponding connecting features 268. In other embodiments, the first lateral portion and/or the second lateral portion may include more or fewer connecting features (e.g., one connecting feature, two connecting features, four connecting features, six connecting features, etc.). In some embodiments, the second particle tube may include a first longitudinal portion and/or a second longitudinal portion, in place of or in addition to the first lateral portion and/or the second lateral portion, that are coupled to one another to at least partially form the second particle tube.

Additionally, as illustrated, each connecting feature 264 of the first lateral portion 260 includes a buckle, and each corresponding connecting feature 268 of the second lateral portion 262 is includes hook. The connecting features 264 (e.g., the buckles) of the first lateral portion 260 are configured to engage and receive the corresponding connecting features 268 (e.g., the hooks) of the second lateral portion 262 to secure the second particle tube 84 in the closed position. In certain embodiments, the connecting features of the first lateral portion and/or the second lateral portion may include other elements and/or mechanisms configured to secure the second particle tube in the closed position, such as hook(s), magnet(s), adhesive, hook-and-loop fastener(s), clip(s), other suitable feature(s), or a combination thereof. For example, the connecting features of the first lateral portion may include hooks, and the corresponding connecting features of the second lateral portion may include buckles configured to receive the hooks to secure the second particle tube in the closed position. In some embodiments, the first lateral portion of the second particle tube and the second lateral portion of the second particle tube may be coupled to one another via tool-based elements, such as screw(s), rivet(s), bolt(s), etc. In certain embodiments, the first lateral portion of the second particle tube and the second lateral portion of the second particle tube may be coupled to one another via a plastic weld and/or other securing/coupling methods. For example, the first longitudinal end of the first lateral portion of the second particle tube may be plastically welded to the first longitudinal end of the second lateral portion of the second particle tube to secure the second particle tube in the closed position.

The first longitudinal end 266 of the first lateral portion 260 and the first longitudinal end 270 of the second lateral portion 262 form a first longitudinal side 272 of the second particle tube 84. As described in greater detail below, a hinge (e.g., a living hinge) is positioned at a second longitudinal side of the second particle tube 84. The hinge is configured to couple the first lateral portion 260 to the second lateral portion 262 and to enable the first lateral portion 260 and the second lateral portion 262 to pivot relative to one another.

The second particle tube 84 and the components thereof (e.g., the first lateral portion 260, the second lateral portion 262, and the hinge) may be formed as a single component via an injection molding process. For example, the second particle tube 84 may initially be formed in the open position described below and may include the first lateral portion 260, the second lateral portion 262, and the hinge as a single, continuous component. The second particle tube 84 may be folded along the hinge such that the connecting features 264 of the first lateral portion 260 move toward and engage the corresponding connecting features 268 of the second lateral portion 262. After the connecting features 264 of the first lateral portion 260 engage the corresponding connecting features 268 of the second lateral portion 262, the second particle tube 84 is secured in the illustrated closed position and is configured to direct the particles from the sensor housing toward the trench in the soil. Additionally, the second particle tube 84 includes, via the injection molding process, the features enabling coupling to the first particle tube and to the sensor housing, such as the coupling mechanisms 112 and the ear 190. In certain embodiments, the second particle tube, or portion(s) thereof, may be molded via a mandrel. For example, the second particle tube may be extruded/pulled from plastic stock material and each end of the second particle tube (e.g., the extruded first particle tube) may be fastened closed via one or more of the methods described herein.

Figure 9:
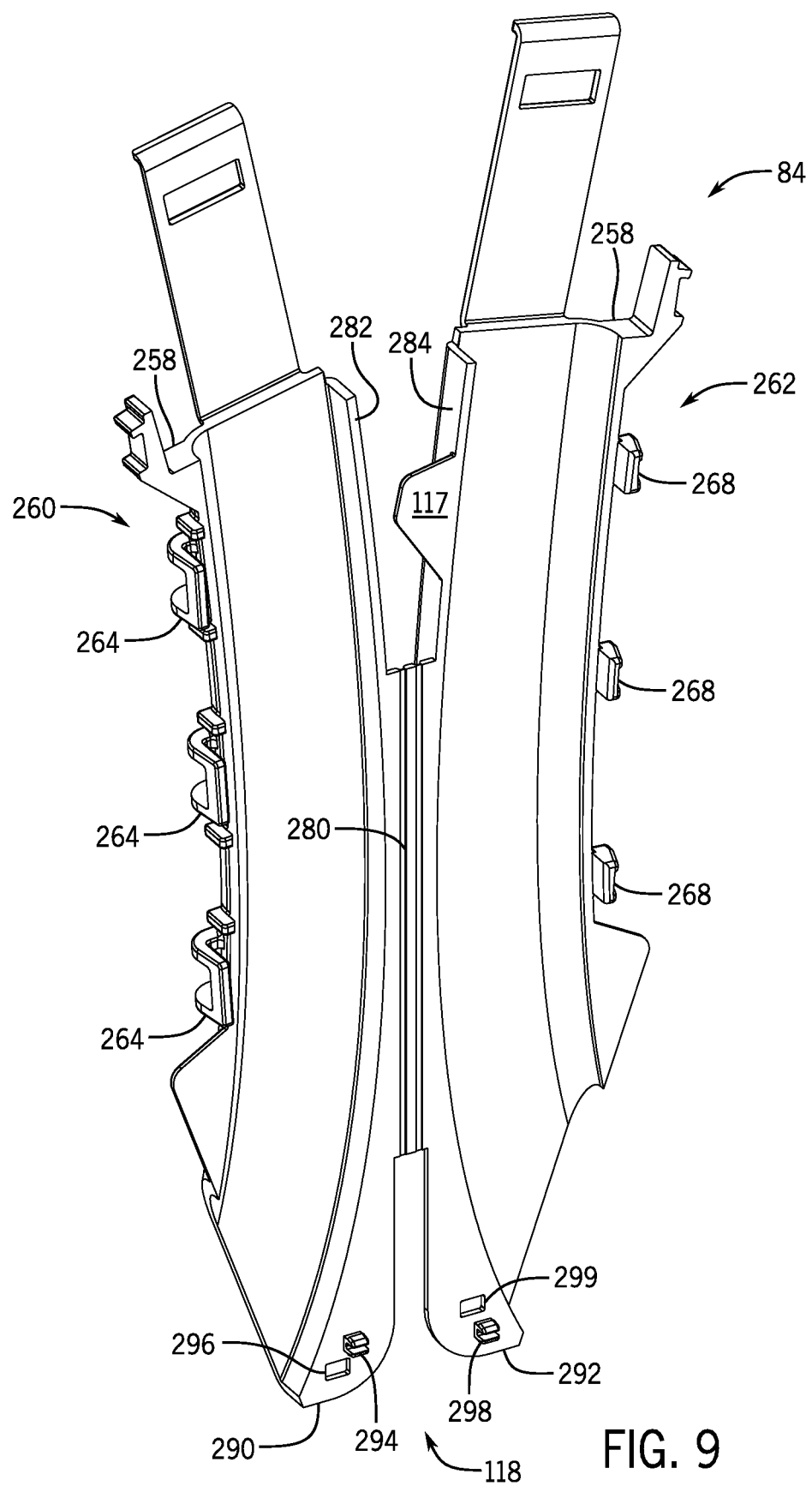
FIG. 9 is a perspective view of the second particle tube of FIG. 8 in an open position, in accordance with an aspect of the present disclosure.

FIG. 9 is a perspective view of the second particle tube 84 of FIG. 8 in an open position. As illustrated, the second particle tube 84 includes the first lateral portion 260, the second lateral portion 262, and a hinge 280 coupled to and adjoining the first lateral portion 260 and the second lateral portion 262. In the illustrated embodiment, the hinge 280 is coupled to (e.g., integrally formed with) a second longitudinal end 282 of the first lateral portion 260 and to (e.g., integrally formed with) a second longitudinal end 284 of the second lateral portion 262. The first lateral portion 260 and the second lateral portion 262 are configured to move/pivot about the hinge 280 to move the second particle tube 84 from the open position of FIG. 9 to the closed position of FIG. 8 (e.g., the connecting features 264 of the first lateral portion 260 move toward and engage the corresponding connecting features 268 of the second lateral portion 262 to secure the second particle tube in the closed position).

As described above, the first lateral portion 260, the second lateral portion 262, and the hinge 280 may be formed as a single, continuous component via the injection molding process. Additionally, the first lateral portion 260, the second lateral portion 262, and the hinge 280 may be formed from a single material, such as polypropylene or another suitable plastic. Further, the hinge 280 is a living hinge integrally formed with the first lateral portion 260 and the second lateral portion 262. As illustrated, the hinge 280 is a single hinge coupled to and adjoining the first lateral portion 260 of the second particle tube 84 and the second lateral portion 262 of the second particle tube 84. In other embodiments, the second particle tube may include multiple hinges (e.g., two hinges, three hinges, fives hinges, etc.) coupled to and adjoining the first lateral portion of the second particle tube and the second lateral portion of the second particle tube.

In other embodiments, the first lateral portion of the second particle tube and the second lateral portion of the second particle tube may be formed separately, and/or the hinge may be integrally formed with only the first lateral portion or only the second lateral portion. The lateral portion (e.g., the first lateral portion of the second particle tube or the second lateral portion of the second particle tube) having the integrally formed hinge may subsequently be coupled to the other lateral portion to form the second particle tube (e.g., via plastic welding, connecting feature(s), tool-based elements, other connecting mechanism(s)/method(s), or a combination thereof). In some embodiments, the hinge may be formed as a separate component that is subsequently coupled to both the first lateral portion of the second particle tube and the second lateral portion of the second particle tube (e.g., via plastic welding, connecting feature(s), tool-based elements, other connecting mechanism(s)/method(s), or a combination thereof). In certain embodiments, the hinge may be omitted, and the first lateral portion of the second particle tube and the second lateral portion of the second particle tube may be coupled along their respective second longitudinal sides via plastic welding, connecting feature(s), tool-based elements, other connecting mechanism(s)/method(s), or a combination thereof.

As illustrated, the first lateral portion 260 of the second particle tube 84 includes a first side 290 of the second standoff 118, and the second lateral portion 262 of the second particle tube 84 includes a second side 292 of the second standoff 118. The first side 290 and the second side 292 may join together to form the second standoff 118. In the illustrated embodiment, the first lateral portion 260 includes protrusions 294 extending from the first side 290 and configured to extend through (e.g., snap into) a corresponding aperture 296 formed in the second side 292 when the second particle tube 84 is in the closed position of FIG. 8. Additionally, the second lateral portion 262 includes protrusions 298 extending from the second side 292 and configured to extend through (e.g., snap into) a corresponding aperture 299 formed in the first side 290 when the second particle tube 84 is in the closed position of FIG. 8. In certain embodiments, the other standoffs (e.g., the first standoff and/or the third standoff) of the second particle tube may include similar and/or different features that may at least partially secure the second particle tube in the closed position. In some embodiments, the features of the second standoff at least partially securing the second particle tube in the closed position may be omitted.

The embodiments of a particle delivery assembly described herein may include a sensor housing configured to house particle sensor(s) configured to detect particles flowing through the particle delivery assembly. In certain embodiments, the particle delivery assembly includes a first particle tube configured to receive the particles from a particle metering and singulation unit (e.g., including a metering wheel, a metering disc, etc.). The first particle tube is coupled to the sensor housing, and the sensor housing is configured to receive the particles from the first particle tube. The particle delivery assembly also includes a second particle tube coupled to the first particle tube. The second particle tube receives the particles from the sensor housing and directs the particles toward the trench in the soil. The particle delivery assembly includes a coupling mechanism extending from the second particle tube, along the sensor housing, and engaged with the first particle tube. As such, the sensor housing is positioned along a flow path of the particles between the particle metering and singulation unit and the trench to enable detection of the particles along the flow path.

In certain embodiments, the first particle tube, the second particle tube, and the coupling mechanism are formed using an injection molding process. For example, each of the first particle tube and the second particle tube includes a first lateral portion, a second lateral portion, and a hinge (e.g., a living hinge) that couples the first lateral portion and the second lateral portion to one another. After being formed via the injection molding process, each of the first particle tube and the second particle tube is folded along the hinge such that the first lateral portion and the second lateral portion contact one another. Each first lateral portion includes first connecting feature(s) (e.g., buckle(s)) that interface with corresponding second connecting feature(s) (e.g., hook(s)) of the respective second lateral portion to secure the respective particle tube in the folded/closed position. As such, each particle tube of the particle delivery assembly may be formed as a single piece and quickly and easily assembled into the particle delivery assembly, which is configured to deliver the particles into the trench in the soil.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A particle delivery assembly of an agricultural row unit, comprising:
    a particle tube configured to receive a particle and to deliver the particle toward a trench in soil, wherein the particle tube comprises:
    a first body portion;
    a second body portion; and
    a hinge directly coupled to the first body portion and to the second body portion, wherein the hinge is integrally formed with the first body portion and second body portion, and the hinge is configured to enable the first body portion and the second body portion to pivot relative to one another between an open position of the particle tube and a closed position of the particle tube.

2. The particle delivery assembly of claim 1, wherein the first body portion comprises at least one connecting feature extending from a first end of the first body portion, and the second body portion comprises at least one corresponding connecting feature extending from a first end of the second body portion.

3. The particle delivery assembly of claim 2, wherein the at least one connecting feature of the first body portion is configured to interface with the at least one corresponding connecting feature of the second body portion to secure the first end of the first body portion to the first end of the second body portion in the closed position of the particle tube.

4. The particle delivery assembly of claim 2, wherein a second end of the first body portion, disposed opposite the first end of the first body portion, is coupled to the hinge, and a second end of the second body portion, disposed opposite the first end of the second body portion, is coupled to the hinge.

5. The particle delivery assembly of claim 2, wherein the at least one connecting feature of the first body portion comprises three first connecting features of the first body portion, and the at least one corresponding connecting feature of the second body portion comprises three second connecting features of the second body portion.

6. The particle delivery assembly of claim 2, wherein the at least one connecting feature of the first body portion comprises at least one buckle, the at least one corresponding connecting feature of the second body portion comprises at least one hook, and each buckle of the at least one buckle is configured to interface with a respective hook of the at least one hook to secure the first end of the first body portion to the first end of the second body portion in the closed position of the particle tube.

7. The particle delivery assembly of claim 1, wherein the first body portion, the second body portion, and the hinge are integrally formed from the same material.

8. The particle delivery assembly of claim 7, wherein the material is plastic.

9. The particle delivery assembly of claim 1, wherein the hinge comprises a living hinge.

10. The particle delivery assembly of claim 1, wherein the hinge is coupled to a first end of the first body portion and to a first end of the second body portion, and a second end of the first body portion and a second end of the second body portion are configured to be plastically welded to one another to secure the particle tube in the closed position of the particle tube.

11. A particle delivery assembly of an agricultural row unit, comprising:
    a first particle tube configured to receive a particle, wherein the first particle tube comprises:
    a first body portion;
    a second body portion; and
    a hinge coupled to the first body portion and to the second body portion, wherein the hinge is configured to enable the first body portion and the second body portion to pivot relative to one another between an open position of the first particle tube and a closed position of the first particle tube; and
    a second particle tube configured to receive the particle from the first particle tube and to direct the particle toward a trench in soil, wherein the second particle tube is coupled to the first particle tube, and the second particle tube comprises:
    a first body portion;
    a second body portion; and
    a hinge coupled to the first body portion of the second particle tube and to the second body portion of the second particle tube, wherein the hinge of the second particle tube is configured to enable the first body portion of the second particle tube and the second body portion of the second particle tube to pivot relative to one another between an open position of the second particle tube and a closed position of the second particle tube.

12. The particle delivery assembly of claim 11, comprising a respective flap extending between the first body portion of the second particle tube and the first body portion of the first particle tube, between the second body portion of the second particle tube and the second body portion of the second particle tube, or both, to at least partially secure the second particle tube to the first particle tube.

13. The particle delivery assembly of claim 12, wherein the first body portion of the first particle tube, the second body portion of the first particle tube, the first body portion of the second particle tube, the second body portion of the second particle tube, or a combination thereof, comprise a respective ledge engaged with an aperture of the respective flap.

14. The particle delivery assembly of claim 11, wherein the first body portion of the second particle tube comprises a protrusion extending through an aperture of the second body portion of the second particle tube to at least partially secure the second particle tube in the closed position.

15. The particle delivery assembly of claim 11, wherein the first particle tube comprises at least one buckle extending from the first body portion of the first particle tube, the first particle tube comprises at least one hook extending from the second body portion of the first particle tube, and the at least one buckle is configured to engaged the at least one hook to secure the first particle tube in the closed position.

16. The particle delivery assembly of claim 11, wherein the second particle tube comprises at least one buckle extending from the first body portion of the second particle tube, the second particle tube comprises at least one hook extending from the second body portion of the second particle tube, and the at least one buckle is configured to engaged the at least one hook to secure the second particle tube in the closed position.

17. The particle delivery assembly of claim 11, wherein the first body portion of the first particle tube, the second body portion of the first particle tube, and the hinge of the first particle tube are integrally formed from the same material.

18. The particle delivery assembly of claim 11, wherein the second particle tube comprises one or more standoffs extending from the first body portion of the second particle tube, from the second body portion of the second particle tube, or both, and the one or more standoffs are configured to abut at least one other component of the agricultural row unit.

19. The particle delivery assembly of claim 11, wherein the hinge of the first particle tube comprises a living hinge, the hinge of the second particle tube comprises a living hinge, or a combination thereof.

20. A particle delivery assembly of an agricultural row unit, comprising:
  a first particle tube configured to receive a particle, wherein the first particle tube comprises:
    a first body portion;
    a second body portion; and
    a hinge coupled to the first body portion and to the second body portion, wherein the hinge is configured to enable the first body portion and the second body portion to pivot relative to one another between an open position of the first particle tube and a closed position of the first particle tube;
  a sensor housing coupled to the first particle tube, wherein the sensor housing is configured to receive the particle from the first particle tube, and the sensor housing is configured to house a sensor configured to detect the particle received from the first particle tube;
  a second particle tube coupled to the first particle tube and to the sensor housing, wherein the second particle tube is configured to receive the particle from the sensor housing and to expel the particle toward a trench in soil, and the second particle tube comprises:
    a first body portion;
    a second body portion;
    a hinge coupled to the first body portion of the second particle tube and to the second body portion of the second particle tube, wherein the hinge of the second particle tube is configured to enable the first body portion of the second particle tube and the second body portion of the second particle tube to pivot relative to one another between an open position of the second particle tube and a closed position of the second particle tube; and
  a coupling mechanism extending between the second particle tube and the first particle tube along the sensor housing, wherein the coupling mechanism is configured to couple the second particle tube to the first particle tube and to at least partially secure the sensor housing between the first particle tube and the second particle tube.

* * * * *